United States Patent [19]

Hubbard et al.

[11] Patent Number: 4,457,463
[45] Date of Patent: Jul. 3, 1984

[54] TRACTOR APPARATUS

[75] Inventors: Leo J. Hubbard; Raymond P. Hubbard; Erwin J. Strobel, all of Rio Grande, P.R.

[73] Assignee: P.H.D. of Puerto Rico, Inc., Fajardo, P.R.

[21] Appl. No.: 407,020

[22] Filed: Aug. 11, 1982

[51] Int. Cl.³ .............................................. G03B 1/30
[52] U.S. Cl. ........................................ 226/74; 226/6
[58] Field of Search .................. 226/6, 9, 25, 52, 74, 226/75, 170–172; 271/34, 35; 400/616, 616.1, 616.2

[56] References Cited

U.S. PATENT DOCUMENTS

| | | | |
|---|---|---|---|
| 2,919,916 | 9/1956 | Davidson et al. | 226/81 |
| 3,015,425 | 6/1959 | Wicklund | 226/74 |
| 3,688,959 | 2/1976 | Staneck | 226/75 |
| 3,750,919 | 8/1973 | Hoffman | 226/9 |
| 3,930,601 | 1/1976 | Masuda | 226/74 |
| 3,941,288 | 3/1976 | Wanat | 226/74 |
| 3,960,304 | 6/1976 | Holland-Letz | 226/74 |
| 4,130,230 | 10/1977 | Seitz | 226/75 |
| 4,226,353 | 10/1980 | Blaskovic et al. | 226/74 |
| 4,239,405 | 12/1980 | Van Horn et al. | 226/74 |

FOREIGN PATENT DOCUMENTS 649199   1/1951   United Kingdom .................. 226/74

Primary Examiner—Leonard D. Christian
Attorney, Agent, or Firm—Martin Lukacher

[57] ABSTRACT

High performance tractor apparatus having one or more of the following features: selectable tractor feed or friction feed of the web where the tractor and friction feed modes are carried out in non-interfering relationship and with precision line registration in either mode; a latch-down lid which is movable between closed position over the tractor belt and open position for threading of the web with one hand without sacrificing the hold-down force exerted by the latch when the lid is in closed position; hinging of the lid from the frame without any parts other than the frame and lid themselves which can be latched together to provide a unitary assembly; and tensioning of the belt with a shoe which is spring-biased but fixed in position upon assembly of the tractor to apply predetermined tensioning to the belt which may be reestablished from time to time by releasing and then reapplying the clamping force which holds the frame together and fixes the position of the shoe in the frame.

41 Claims, 13 Drawing Figures

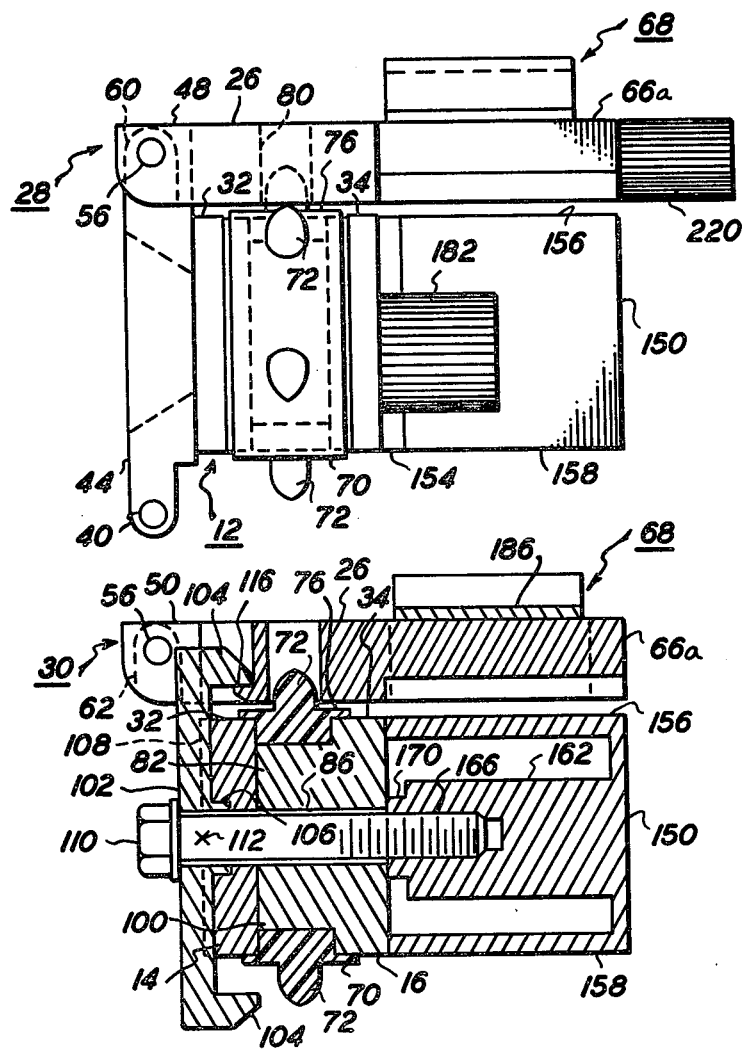
FIG. 4
FIG. 6
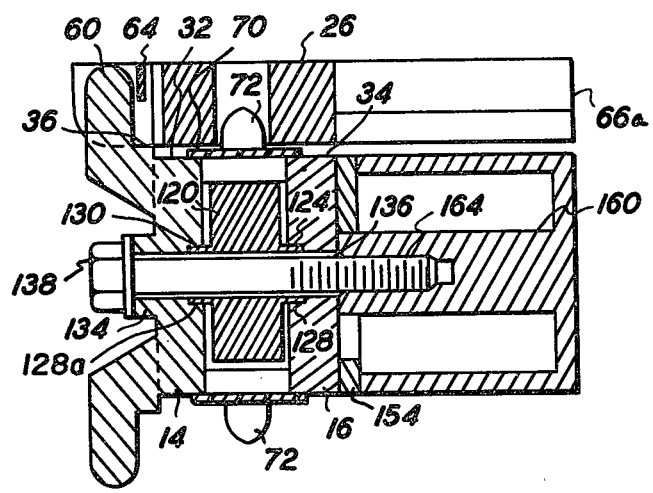
FIG. 7

TRACTOR APPARATUS

DESCRIPTION

The present invention relates to tractor apparatus for feeding documents, forms, sheets and other webs, especially through printers and typewriters for printing characters, symbols and other graphics thereon, and particularly to improved mechanisms providing for high performance feeding of webs and for enabling the web to be driven in a tractor feed mode with perforations in the webs in engagement with the tractor belt or in friction feed mode in engagement with a pressure roller.

The improvements provided by the invention enhance the performance of tractors of the type described in U.S. Pat. Nos. 3,825,162 issued July 23, 1974, 4,129,239 issued Dec. 12, 1978 and 4,199,091 issued Apr. 22, 1980 all to Leo J. Hubbard. Features of the invention may be used to improve the performance of tractors of the type having a belt with pins and drive elements thereon as described in the above mentioned patents. Features of the invention may be used to provide tractor apparatus with means for friction feeding of the webs by means of a pressure roller motivated by the same drive mechanism, which may include the same shaft which drives a sprocket disposed in driving relationship with the tractor belt. The invention will be described in detail in connection with tractor apparatus affording both the tractor and friction feed modes of operation. It will be understood, however, that features of the invention also provide improvement in the performance of the tractor feed portion of the apparatus which may be used alone and without the friction feed portion thereof.

Features of the invention, therefore, provide tractor apparatus which can be selectively operated either in tractor feed or friction feed modes of operation with accurate guidance and precise line registration of the web in either mode.

It is another feature of the invention to provide improved tractor apparatus having dual, tractor and friction feed modes of operation wherein the friction feed and tractor feed portions of the apparatus are arranged in non-interfering relationship. In other words when the apparatus is friction feeding the web, the web is maintained precisely and only in friction feed relationship with the friction drive element (a pressure roller and accompanying pinch roller) of the apparatus and out of the way of the tractor belt. When the web is driven in the tractor feed mode by the belt, it is not affected by the friction feed portions of the apparatus such that precise tractor feed is obtained.

It is another feature of the invention to provide an improved latching mechanism wherein the frame of the tractor, the lid and latch mounted on the frame and having a detent releasably engageable with a catch on the frame are all arranged so that the lid may be latched in closed position and released from latched relationship with a one-hand operation and without a special dexterity being required to release the latch while opening the lid.

It is a further feature of the invention to provide for hinging of the lid and the frame in a manner which eliminates hinge parts other than parts which are integral with the lid and frame and which enable the lid and frame to be kept together in a manner which does not interfere with the pivotal movement of the lid from closed position over the belt to an open position, so as to enable the web to be threaded on the belt.

It is a still further feature of the invention to provide improved means for tensioning the belt which enables a predetermined tensioning force to be applied to the inside of the belt automatically in the course of assembly of the tractor and which is operative to maintain the tension without the need for movable parts during tractor operation. This improved tractor tensioning also permits the predetermined tension to be reset by releasing the clamping force on the frame such that the tensioning force is reapplied and then reset when the frame is again clamped together.

Briefly described, a combined tractor and friction feed mechanism embodying the invention has a frame, a sprocket journaled in the frame, and a belt movably mounted on the frame and entrained on the sprocket. Web support means presents a web support surface adjacent to, and preferably parallel and in alignment with the belt. A pressure roller is disposed in axial alignment with the sprocket and in alignment with the support surface. The pressure roller is preferably integral with the sprocket and driven by the same drive shaft which extends axially therethrough. A lid is hinged to the frame and is pivotable about a hinge axis toward and away from a closed position directly above the belt. A resilient latch is mounted on the frame and is pivotable about an axis spaced from and parallel to the axis on which the lid is hinged. The latch has a detent thereon, and the lid has a catch. The detent and catch are movable into and out of engagement when the lid is pivoted about the hinge axis. The latch may be released and engaged with one hand on pivoting of the lid and without the latch having to be actuated separately.

The pinch roller is yieldably mounted, preferably in self-centering relationship, on the lid to press the web against the pressure roller when the lid is in the closed position. Means are provided for moving and maintaining the pinch roller away from the pressure rollet to enable the web to be engaged separately in tractor feed relationship with the belt and in friction feed relationship with the pressure roller. A member is movably mounted between the frame and the support surface. Means are provided for moving the member into a position to present a surface for engaging an edge of the web to guide the web for friction feed to maintain the web in non-interfering relationship with the tractor belt, when the friction feed mode is selected. When the tractor feed mode is selected, the pinch roller and the guide member are actuated and maintained in position out of the way of the web. This enables the tractor feed mode to be obtained without interference with the friction feed mode. The lid may be provided with improved hinging means where pins and posts integral with the lid and frame of the tractor are axially movable with respect to each other into engagement. A latch on the lid keeps the hinge in assembled relationship with the pins on the posts. A shoe is disposed in sandwiched relationship between side plates of the frame for tensioning the belt. A leaf spring, preferably integral with the shoe, bears upon an internal part of the frame so as to apply predetermined tensioning force on the belt via the shoe. This force is set and maintained upon assembly of the tractor when the side plates and shoe are clamped together. The tension may be reset merely be releasing and then reapplying the clamping force so as to allow the shoe to move under the bias of its spring to apply the predetermined tensioning force to the belt. It will be apparent that the latching, hinging and tensioning features of the invention may be applied to provide a high-performance tractor apparatus as well as a tractor which has both tractor and friction feed modes of operation.

The foregoing and other objects, features and advantages of the invention, as well as a presently preferred embodiment thereof in a combined tractor/friction web feed mechanism, will become more apparent from a reading of the following description in connection with the accompanying drawings in which:

FIG. 4 is a front view of the apparatus shown in FIG. 1;

FIG. 6 is a sectional view taken along the line 6—6 in FIG. 1;

FIG. 7 is a sectional view taken along line 7—7 in FIG. 1;

Figure 1:
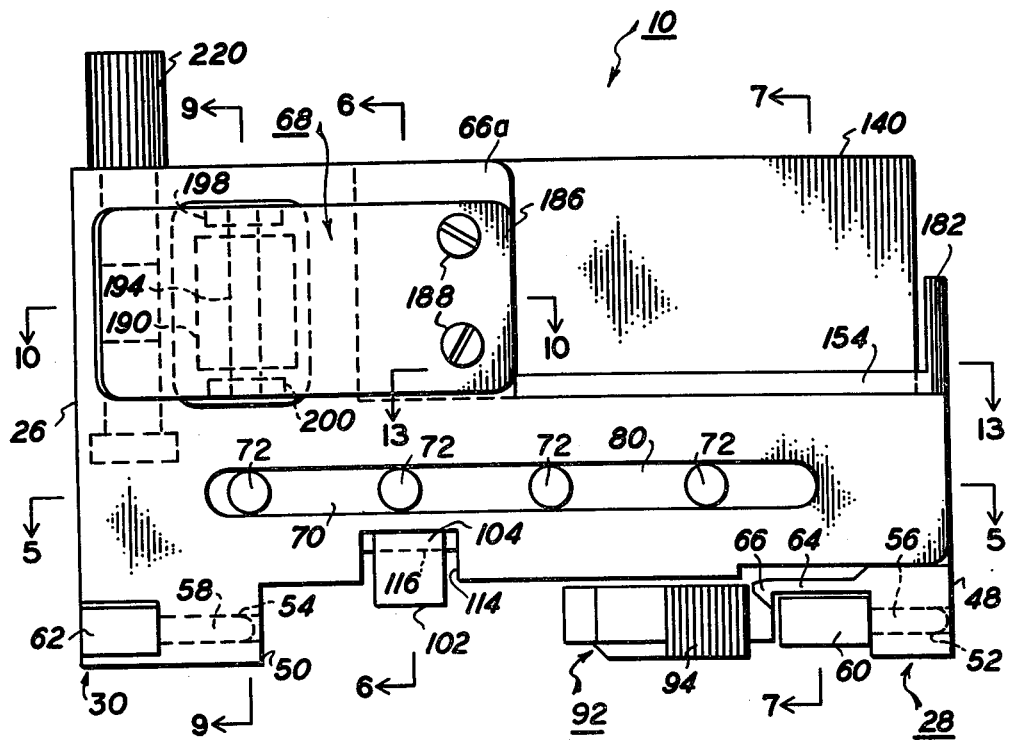
FIG. 1 is a top view of tractor apparatus provided in accordance with the invention, the illustrated apparatus being a combined, selectable tractor and friction feed mechanism for feeding or metering the left-hand side of the web, another tractor apparatus similar to, but a mirror image of, the illustrated tractor apparatus is used to or feed meter the right-hand side of the web.

Referring the the drawing, there is shown a combined tractor and friction feed mechanism 10, having a frame 12 with an outboard rear side or plate 14 and an inboard or front side plate 16. A sprocket 18 is journaled in the frame 12 and has journals 20 and 22 extending through the outboard side plate 14 and inboard side plate 16 respectively. The journal 22 has a longer axial length than the journal 20. A square hole 24 receives a square drive shaft (not shown).

Hinged to the frame is a lid 26 which is pivotally mounted on hinges 28 and 30. The lid 26 is shown in closed position in the drawing set at a predetermined distance or gap length above the top surfaces 32 and 34 of the frame 12 by a step 36 on the outboard side plate 14 (see FIG. 7). The lid 26 may be pivoted rearwardly about the hinges 28 and 30 up to 180° to enable the web to be threaded in the mechanism 10. Facilities are provided for another and bottom lid (not shown) to be pivotally mounted on the frame on hinges provided in part by hinge pins 40 and 42 which extend axially in the same direction from posts 44 and 46 which are rearwardly and downwardly extending from the outboard side plate 14. The hinges 28 and 30 are provided by projections 48 and 50 from the outboard or rear edge of the lid 26. Holes 52 and 54 receive pins 56 and 58 projecting from posts 60 and 62 on the outboard side frame 14. The axis of the pins 56 and 58 and of the hinge is parallel to, rearwardly of, and above the top surfaces 32 and 34 of the side plates 14 and 16. The location of this axis is important in latching and unlatching or releasing of the lid 26 as will be explained in greater detail below.

Extending inwardly from the projection 48 is a resilient latch 64 having a detent 66 which releasably engages the inside end of the post 60 when the lid is mounted by inserting the pins 56 and 58 into the holes 52 and 54. The lid also has an inboard extension 66a from its front edge on which is mounted a pinch roller assembly 68. The pinch roller assembly is used in the friction feed mode of operation of the mechanism 10 and will be described in greater detail hereinafter.

A belt 70 has pins 72 and drive elements 74 which are integral therewith and referred to herein in its entirety as a belt. The belt is entrained on the sprocket 18. The web is engaged on the top side 76 of the belt by the pins 72 entering the edge perforations in the web. In the event that another lid is used the web may also be engaged on the bottom side 78 thereof. the pins 72 extend through a slot 80 in the lid 26.

A block 82, which is an integral part of the inboard side plate 16, supports the belt 70 and sets the vertical height thereof to be essentially coplanar with the top surfaces 32 and 34 of the frame 12 and also the bottom surfaces of the frame. The walls of the frame 12 aove the belt supporting surfaces of the block which are parallel to the sides of the belts 76 and 78 also provide for edge guidance of the belt, as explained in the above referenced U.S. Pat. No. 3,825,162.

Figure 2:
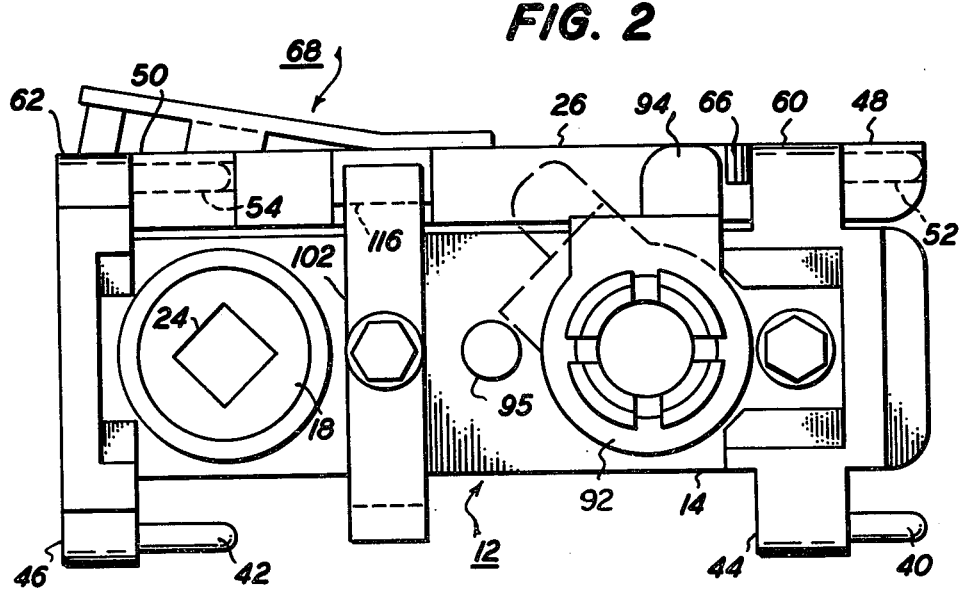
FIG. 2 is a left-side view of the apparatus shown in FIG. 1.
Figure 3:
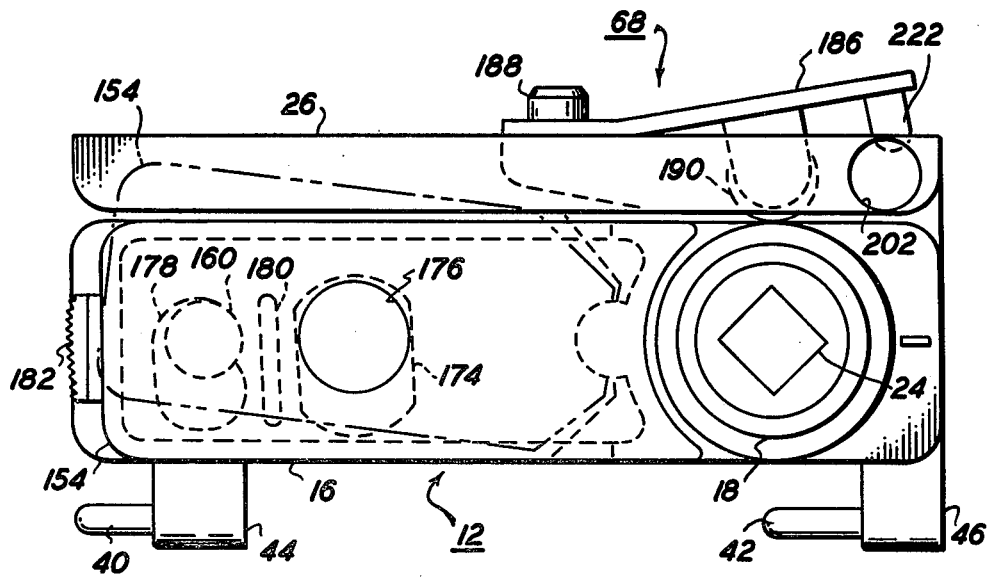
FIG. 3 is a right-side view of the apparatus shown in FIG. 1.

The block 82 and the remaining portion of the inboard side plate 16 of which it is a part, as well as the outboard side plate 14 have aligned holes 84 and 86 therein. The hole 84 receives the sleeve 88 of a floating collet clamp mechanism 90. This mechanism locks the tractor on a support shaft (not shown) which is parallel to the drive shaft while enabling it to move laterally to adjust for the width of the web and to float longitudinally in the direction of travel of the belt along the sides 76 and 78 thereof, as explained in the above referenced U.S. Pat. No. 4,129,239. The clamp is closed by a ring 92 (see FIG. 2) with a tab 94 extending therefrom. The inner diameter of the ring 92 has a cam surface which causes the sleeves 88 to come together and clamp onto the support shaft. The collet clamp mechanism is shown in full in the locked position. The dash lines indicate the position of the ring 92 against a post 95 which provides a stop when it is in the open position so as to permit lateral adjustment of the mechanism along the drive and support shafts.

An opening 96 in the block 82 reduces the amount of material, preferably glass and TEFLON filled and polycarbonate plastic used in the construction thereof, as well as the construction of all of the other parts of the mechanism 10, except for the belt. The belt may be of other plastic material, as described in the above referenced U.S. Pat. No. 3,825,162. Four holes 98 in the block 82 cooperate with alignment pins (not shown) on the outboard side plate 14 in order to align the side plates 14 and 16 when their opposed surfaces are brought into juxtaposition as shown at 100 in FIG. 6.

The mechanism has latching means for releasably latching the lid 26 in the position shown in the drawings. These latching means comprise a resilient latching bar 102 having detents 104 on the ends thereof. A central boss 106 and a slot 108 or notch of depth much smaller than the width of the bar 102 facilitate the location of the bar 102 vertically on the rear or outboard surface of the outboard side plate 14. Attaching means in the form of a screw 110 pivotally mounts the bar 102 about an axis indicated generally at 112 in FIG. 6. This axis 112 is spaced below and inwardly of the axis of the hinges 28 and 30. A notch 114 in the rear edge of the lid 26 has a catch 116 provided by a step generally parallel to the top surfaces 32 and 34 of the frame 12 when the lid is in closed position as shown in the drawings. The detent end 104 and the end of the catch 116 are tapered. In operation, when the lid is closed, these tapered surfaces engage to cause the bar to pivot generally about the axis 112 in a rearward direction. When the catch 116 clears the detent 104 the detent snaps over the catch and holds the lid 26 latched in closed postion. Consider that when the lid is open by pivoting it in the counterclockwise direction as shown in FIG. 6, the catch 116 travels along an epicyclic path with respect to the detent because of the relative location of the axis 112 and the axis of the hinges 28 and 30 about which they pivot. The paths of movement are in opposite directions and facilitate the clearing and release of the detent 104 fromm the catch 116. Accordingly, the latch can be automatically moved to closed position, as shown in the drawing, or to open position to faciliate threading of the web by a one-hand manipulation of the lid and without need to actuate or move the latch bar 102. The latch bar may be made of glass and TEFLON filled polycarbonate and will provide sufficient resilience and lubrication to effect positive latching, as well as to enable release of the latch.

Figure 5:
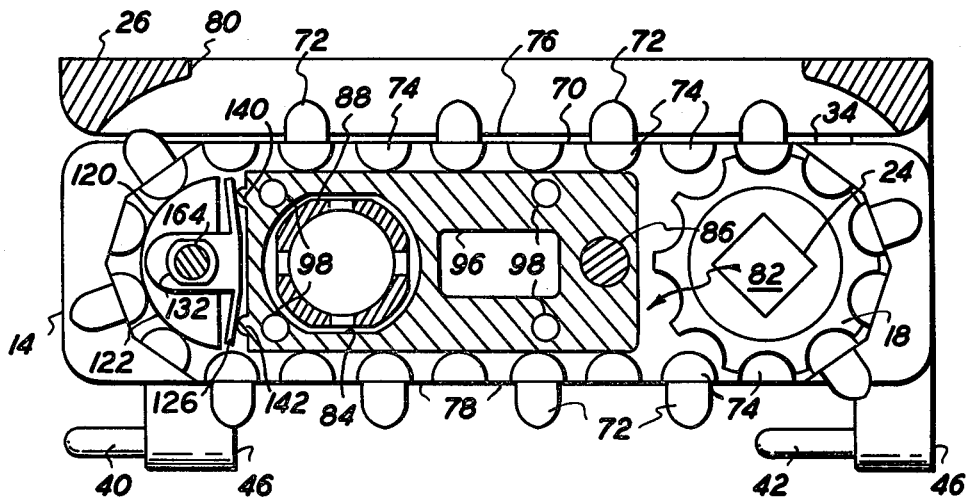
FIG. 5 is a sectional view, the section being taken along the line 5—5 in FIG. 1.
Figure 8:
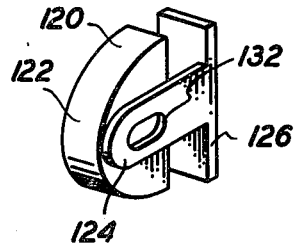
FIG. 8 is a perspective view of the integral shoe and spring which applies predetermined tension to the belt.

Th belt 70 is tensioned with a predetermined tensioning force by the apparatus best shown in FIGS. 5, 7 and 8. A shoe structure 120 is housed between the side plates 14 and 16 of the frame 12 at the end of the frame, opposite to the end where the sprocket 18 is journaled. The shoe 120 is made up of an integral D-shaped portion with an arcuate surface 122. Arms 124 and 126 extend rearwardly from the surface 122 and support a leaf spring 126. The arms 124 and 130 are guided in slots 128 and 128a in the side plates 16 and 14. A hole 132 through the arms and D-shaped portion of the shoe 120 is in alignment with holes 134 and 136 which receive a screw 138 which clamps the side frame and the shoe, by bearing against the arms 124 and 130, when the mechanism 10 is assembled. The hole 132 is somewhat elongated to allow the shoe to apply the tensioning force to the inside of the belt 70. The leaf spring 126 bears as a beam on projections or ribs 140 and 142 from the block 82. Prior to assembly and before tightening the screw 138 a predetermined spring force, or bias, is exerted against the belt by reason of the resilience of the leaf spring 126. The screw 138 is then tightened to hold the tractor clamped in assembled relationship with the shoe 120 in place. The location of the shoe 120 therefore applies the necessary predetermined bias on the belt 70. In the event that the belt tension changes, for example, after a period of use, it is necessary only to loosen the screw 138. Then the spring 126 again causes the shoe to move and apply the requisite tensioning force to the belt. The screw 138 is then tightened to clamp the shoe 120 and side plates 14 and 16 together. The shoe 120 is preferably molded as a unitary body from glass and TEFLON filled polycarbonate or other suitable plastic materials.

The friction feed of the web is provided by the following parts when used with the mechanism 10, as shown: an extension 66a of the lid 26; a pinch roller assembly 68; a support member 150; a pressure roller 152 and a web-edge guide member 154. The support member 150 presents support surfaces 156 and 158 which are generally in alignment with the top surfaces 32 and 34 and the bottom surfaces of the frame 12. The support member 150 has posts 160 and 162 which bear against the inside surface of the side plate 16.

Holes 164 and 166 in these posts 160 and 162, aligned with frame holes 86 and 136, are threaded for receiving the screws 110 and 138.

Figure 13:
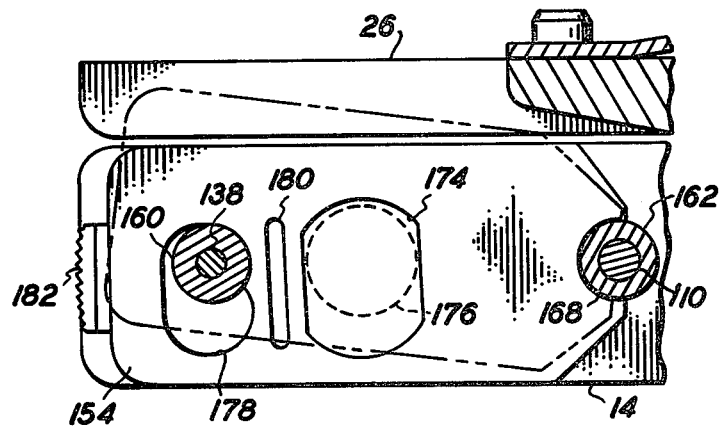
FIG. 13 is a fragmentary sectional view taken along the line 13—13 in FIG. 1.

The guide member 154 (See FIG. 13) is a plate having an annular hole 168 at one end thereof to provide a pivotal connection or bearing surface on a stepped portion 170 of the post 162. The plate has an elongated hole 174 through which extends the support shaft (the position of which is shown by the dashed circle 176 in FIG. 13). Another heart-shaped hole 178 defines a detent which cooperates with the post 160 or a boss (not shown) on the outside of the side plate 16 which is in alignment with the post 160. An elongated hole 180 provides relief so that the arcuate surface of the detent hole 178 may flex as the plate 154 is pivoted about the post 162. A tab 182 is adapted to be engaged by the operator's finger for pivoting the guide plate 154 between a position where its upper edge is above and below the top surface 34 of the inboard side plate 16. The position of the guide plate 154 above the top surface 34 is shown by dash lines in FIG. 13. The post 160 acts as a catch in the upper one of the sections of the heart-shaped wall of the detent hole 178. By moving the tap 182 upward, the plate 154 is pivoted to the position shown in dash lines in FIG. 13. Then the lower section of the heart-shaped wall of the detent hole 178 latches with the post 160 and holds the guide member 154 with its edge above the top surface 34 of the side plate 16. The position of the guide plate 154 shown in dash lines is the position used when the mechanism 10 is used in its friction feed mode. Then the edge of the web engages the side plate and is prevented from moving laterally so as to prevent interference with the belt 70 or any other part of the tractor feed portion of the mechanism 10. Accurate guidance of the web over the pressure roller 152 and under the pinch roller assembly 68 is then obtained.

Figure 9:
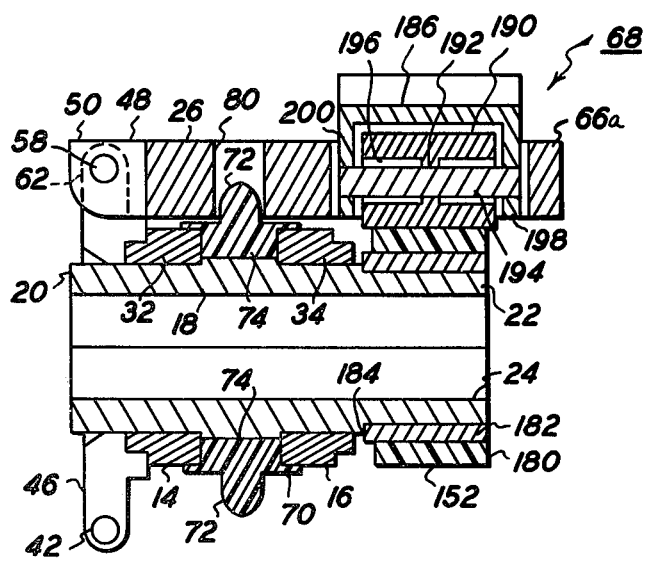
FIG. 9 is a sectional view taken along the line 9—9 in FIG. 1.

The pressure roller 152 is provided by a sleeve or tube 180 of resilient material, suitably polyisoprene bonded to another sleeve 182 of metal, suitably aluminum, which is force fit on the extension 22 of the sprocket journal. A step 184 on the extension 22 precisely sets the axial position of the pressure roller 152 with respect to the sprocket and the other parts of the mechanism. The pitch roller assembly 68 is then accurately positioned over the pressure roller 152. The integral sprocket and pressure roller assembly, as shown best in FIG. 9, thus provides for accurate and precision friction feed of the web.

The pinch roller assembly 68 includes a spring arm or bracket plate 186 which is attached by screws 188 to the lid extension 66a. This bracket 186 is formed with a fold or hinge making an obtuse angle with the plane of the top of the lid 26, and acts as a leaf spring which has a spring bias or force in a direction toward the pressure roller 152. A pinch roller 190 is mounted in self-centering relationship in the pinch roller assembly 68 by reason of a central ring or ridge 192. The ridge is of a diameter such that it makes a force fit with a shaft or pin 194. The diameter of the pin 194 is less than the diameter of an axial hole 196 through the roller 190 from which the ring 192 extends. The pinch roller 190 can therefore pivot and center itself for applying uniform force to the web against the pressure roller 152 when the lid is in closed position as shown best in FIG. 9. The pin 194 is held in ears 198 and 200 depending from the spring plate 186. Thus, the pinch roller is supported effectively in self-centering relationship without the need for gimbals or other complex locating devices.

Figure 10:
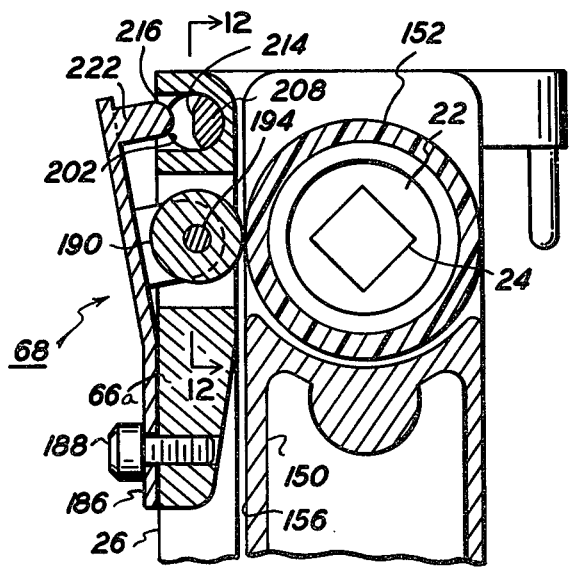
FIG. 10 is a fragmentary sectional view taken along the line 10—10 in FIG. 1, when the apparatus is in the friction feed mode.
Figure 11:
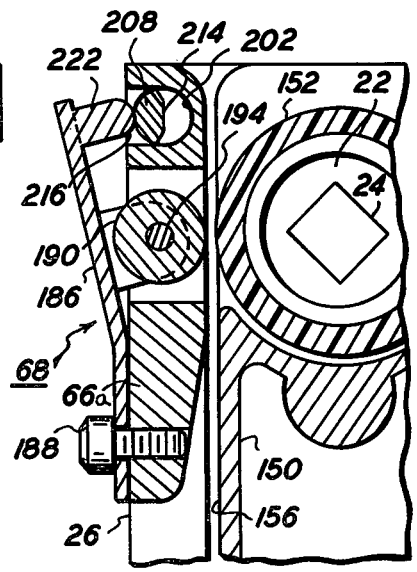
FIG. 11 is a fragmentary sectional view similar to FIG. 10 but showing the position of the pinch roller when the apparatus is in the tractor feed mode.
Figure 12:
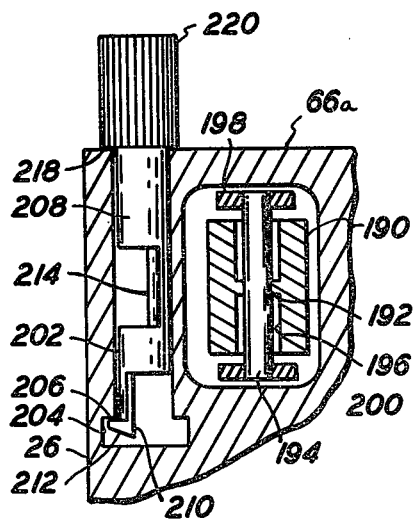
FIG. 12 is a fragmentary sectional view taken along the line 12—12 in FIG. 10.

In order that the pressure roller 152 not interfere with the operation of the mechanism 10 in its tractor feed mode, the pinch roller assembly 68 is actuable to move upwardly away from the pressure roller so that the pinch roller 190 is disengaged from the web and the web may be moved freely by the tractor belt 70. To this end a hole 202, which is a blind hole, extends into the lid extension 66 from the inner edge thereof (see FIG. 12). The inner end 204 of the hole 202 is enlarged and provides a step 206. A shaft 208 is rotatably disposed in the hole 202. The end of the shaft has a latch 210 with a detent 212 which engages the step 206 and holds the shaft 208 in place in the hole 202 while allowing it to rotate. The shaft 208 has an indentation formed with a cam surface 214. A hole 216 extends downwardly from the top of the lid 26 and exposes the cam surface 214. The latch 210 and also a step 218 between a knurled portion 220 of the shaft 208 and the portion thereof in the hole 202 assures that the cam surface will be located so that it is exposed to the top of the lid through the hole 216. A cam follower 222 which extends downwardly from the plate 186 which spring biases the pinch roller 190 moves into and out of engagement with the cam surface 214. When the knurled end 220 of the shaft 208 is rotated to the position shown in FIG. 10, the cam surface clears the follower 222 and the pinch roller moves under the bias of the spring plate 186 to press the web against the pressure roller 152. When, however, the shaft is rotated approximately 180° from the position shown in FIG. 10 to the position shown in FIG. 11, the shaft engages the follower and moves the pinch roller 190 out of engagement with the web and the pressure roller 152. Accordingly, non-interfering operation either in the tractor feed or friction feed modes of operation of the mechanism 10 is readily obtainable.

From the foregoing description it will be apparent that there has been provided improved tractor apparatus for providing high performance tractor feed and which facilitates both tractor feed and friction feed modes of operation. Variations and modifications of the herein described embodiment of the invention will undoubtedly suggest themselves to those skilled in the art. Accordingly, the foregoing description should be taken as illustrative and not in a limiting sense.

We claim:

1. A combined tractor and friction web feed mechanism which comprises a frame, a sprocket journaled in said frame, a belt having web drive elements movably mounted on said frame and entrained on said sprocket, web support means presenting a web support surface adjacent to and parallel with the surface of said belt, a pressure roller in axial alignment with said sprocket and in alignment with said support surface, a lid hinged to said frame and pivotal about a hinge axis toward and away from a closed position directly above said belt, a latch mounted on said frame and pivotal about an axis spaced from and parallel to the axis on which said lid is hinged, said latch having a detent thereon, said lid having a catch movable into and out of engagement with said latch detent when said lid is pivoted about said hinge axis to pivot said detent and bring said catch into and out of engagement with said detent when said lid is pivoted to said closed position directly above said belt and away from said closed position, respectively, whereby to releasably maintain said lid in said closed position, a pinch roller yieldably mounted on said lid to press the web against said pressure roller when said lid is in said closed position, means for moving and maintaining said pinch roller away from said pressure roller to enable said web to be engaged selectively in tractor feed relationship with said belt and in friction feed relationship with said pressure roller, a member movably mounted between said frame and said support surface, and means for moving said member into a position to present a surface for engaging an edge of said web to guide said web for friction feed and out of said last named position to enable said web to be engaged in tractor feed relationship with said belt.

2. The mechanism according to claim 1 wherein said frame has first and second sides, a shoe between said sides presenting a surface to said belt on the inside thereof, a spring biasing said shoe into engagement with said belt for applying a predetermined tension thereto, and means for clamping said shoe between said first and second sides for setting said shoe in fixed position where it applies a predetermined tension to said belt.

3. The mechanism according to claim 2 wherein at least one of said sides has a block thereon which the sides of said belt with which said web is engageable are supported, one end of said block facing said sprocket and the outer facing said shoe, said shoe having a leaf spring integral therewith and bearing upon said other end of said block for biasing said shoe against the inside of said belt until said side and said shoe are clamped in said fixed position.

4. The mechanism according to claim 3 wherein said shoe has an arcuate surface engageable with said inside of said belt, arms interconnecting said leaf spring and said shoe centrally thereof, projections on said other end of said block offset from the center thereof against which said leaf spring bears as a beam, aligned holes in said side frame and fastening means in said aligned holes clamping said shoe and side frames together upon setting of the tension in said belt.

5. The mechanism according to claim 4 wherein said shoe, arms and leaf spring are a single integral part of plastic material.

6. The mechanism according to claim 1 wherein said frame has hinge pins and posts from one side of which said hinge pins extend in the same direction, said lid having holes into which said hinge pins extend, a detent on said lid which catches on the side of at least one of said hinge posts for keeping said pins in said holes without interference with the rotation of said lid about said hinge axis.

7. The mechanism according to claim 6 wherein said lid has spaced projections along the rear edge of said lid, said hinge holes being located in said projection, said detent provided by a spring arm having a base and a lip at its opposite ends and extending sidewise from one of said projections toward the other thereof generally parallel to the axis of said hinge holes in said one projection, and said base being connected to said one projection.

8. The mechanism according to claim 7 wherein said lid, including said projections and detent, is an integral part of plastic material.

9. The mechanism according to claim 1 wherein said latch is a flat bar of spring material having a lip portion located at least one end thereof which extends to said lid to provide said detent, means attaching said bar to said frame for pivotal movement about an axis through said bar parallel to said hinge axis, said latch pivotal axis being spaced inwardly from said hinge axis toward said frame and away from said hinge axis along said frame, said catch being movable into contact with said lip portion to flex said bar in an epicyclic path while moving into and out of engagement therewith.

10. The mechanism according to claim 9 wherein said frame is provided by a pair of side plates having opposite insides and outsides with the insides in juxtaposition with each other, said lid being hinged on one of said side plates outwardly and above the outside thereof, said latch bar being in juxtaposition with the outside of said one side plate, said side plate and bar having aligned holes perpendicular to said insides thereof, fastening means in said holes clamping said bar and said plates together and providing said pivotal mounting for said latch bar.

11. The mechanism according to claim 10 wherein said side plates have top and bottom surfaces around which said belt travels, said latch detent having a lip extending inwardly toward said side plates over the top surface of at least one of said side plates, said lid having a notch along the rear edge thereof, said catch being provided by a step in the wall of said notch interior of said lid rear edge.

12. The mechanism according to claim 11 wherein a portion of said lid and said catch have flat surfaces which engage each other when said lid is latched, portions of said lip over the flat surface thereof and portions of said catch above said step which engage each other when said lid is pivoted towards the top surface being complementarily tapered.

13. The mechanism according to claim 11 wherein said latch bar has detents at the opposite ends thereof each for latching different ones of a pair of lids hinged on said one side plate outwardly of said top and bottom surfaces thereof respectively, said holes being disposed centrally of said latch bar and side plates between said top and bottom surfaces.

14. The mechanism according to claim 1 wherein said pressure roller is integral with said sprocket.

15. The mechanism according to claim 14 wherein said sprocket has journals extending axially on opposite sides thereof, one of said journals having an extension outwardly of said frame, said pressure roller being a tubular sleeve of compliant material disposed on said extension.

16. The mechanism according to claim 15 further comprising a sleeve of metal on said journal extension, said tubular sleeve being bonded to said metal sleeve.

17. The mechanism according to claim 1 wherein said lid has an opening therein facing said pressure roller, a plate on said lid yieldably and rotatably mounting said pinch roller in said lid opening biased toward said pressure roller to frictionally engage said web thereagainst, and said means for moving and maintaining said pressure roller being in engagement with said pinch roller mounting plate.

18. The mechanism according to claim 17 wherein said plate is of spring material having a hinge and being attached to said lid adjacent to said opening.

19. The mechanism according to claim 1 wherein said means for moving and maintaining said pressure roller comprises a shaft rotatably mounted on said lid, said shaft having a cam surface, a cam follower projecting from said plate into engagement with said cam surface whereby it pivots said plate against its bias to selectively bring said pinch roller into and out of web driving relationship with said pressure roller.

20. The mechanism according to claim 19 wherein said lid has a hole with its axis generally parallel to the axis of said pinch roller and disposed outward of said opening in which said pinch roller is disposed toward an end of said lid, said shaft being rotatably mounted in said hole, and opening in said lid over said cam surface of said shaft through which said follower projects, and an extension of said shaft disposed out of said hole for rotating said shaft.

21. The mechanism according to claim 20 wherein said shaft hole has a circular step in the surface thereof, a latch at the end of said shaft having a detent engageable with said step for keeping said shaft in said hole with said cam surface and in alignment with said cam follower.

22. The mechanism according to claim 17 wherein said plate has a pair of ears, a shaft extending between said ears, said pinch roller having an axial hole of diameter greater than said last named shaft with a circumferential ridge centrally disposed between the ends of said pinch roller on which said pinch roller is pivotally mounted on said shaft.

23. The mechanism according to claim 22 wherein said plate, ears and roller are a unitary assembly of plastic material.

24. The mechanism according to claim 1 wherein said pivotal edge guide member is a plate pivotally mounted between said frame and said web support means, said plate having a detent for maintaining said member in different positions with an edge thereof above the plane of said web to edge guide said web when said web is in frictional feed relationship with said pressure roller and with said edge below the plane of said web when said web is in tractor feed relationship with said belt.

25. The mechanism according to claim 24 wherein said support means is a memeber having a plurality of posts which are in juxtaposition with said frame at one end thereof, said guide plate having an annular opening adjacent one end thereof, one of said posts providing a pivotal mounting for the guide plate in said annular opening and the other said post form a boss projecting from said side plate in alignment with said post providing a catch for said detent.

26. The mechanism according to claim 25 further comprising holes in said posts in alignment with holes through said frame, and fastening means in said holes attaching said support member to said frame.

27. The mechanism according to claim 25 wherein said detent is a generally heart-shaped opening extending between the sides of said plate in which said other of said posts or boss is disposed.

28. The mechanism as set forth in claim 25 further comprising a tab extending from the end of said guide plate opposite to said one end thereof for manipulation and movement of said guide plate.

29. In a tractor web feed mechanism having a frame, a sprocket journaled in said frame, a belt having web drive elements movably mounted on said frame and entrained in said sprocket, the improvement which comprises said frame having first and second side, a shoe between said sides presenting a surface to said belt on the inside thereof, a spring biasing said shoe into engagement with said belt for applying a predetermined tension thereto, and means for clamping said shoe between said first and second sides for setting said shoe in fixed position where it applies a predetermined tension to said belt.

30. The invention according to claim 29 wherein at least one of said first and second sides has a block thereon on which the sides of said belt with which said web is engageable are supported, one end of said block facing said sprocket and the other facing said shoe, said shoe having a leaf spring integral therewith and bearing upon said other end of said block for biasing said shoe against the inside of said belt until said side and said shoe are clamped in said fixed position.

31. The invention according to claim 30 wherein said shoe has an arcuate surface engageable with said inside of said belt, arms interconnecting said leaf spring and said shoe centrally thereof, projections on said other end of said block offset from the center thereof against which said leaf spring bears as a beam, aligned holes in said side frame, and fastening means in said aligned holes clamping said shoe and side frames together upon setting of the tension in said belt.

32. The invention according to claim 31 wherein said shoe, arms and leaf spring are a single integral part of plastic material.

33. In a tractor feed web mechanism having a frame, a sprocket journaled in said frame, a belt having web drive elements movably mounted on said frame and entrained on said sprocket, a lid hinged to said frame and pivotal about a hinge axis toward and away from a closed position directly above said belt, the improvement which comprises said frame having hinge pins and posts from one side of which said hinge pins extend in the same direction, said lid having holes into which said hinge pins extend, a detent on said lid which catches on the side of at least one of said hinge posts for keeping said pins in said holes without interference with the rotation of said lid about said hinge axis.

34. The invention according to claim 33 wherein said lid has spaced projections along the rear edge of said lid, said hinge holes being located in said projection, said detent being provided by a spring arm having a base and a lip at its opposite ends and extending sidewise from one of said projections toward the other thereof generally parallel to the axis of said hinge holes in said one projection, and said base being connected to said one projection.

35. The invention according to claim 34 wherein said lid, including said projections and detent, is an integral part of plastic material.

36. In a tractor web feed mechanism having a frame, a sprocket journaled in said frame, a belt having web drive elements movably mounted on said frame and entrained on said sprocket, a lid hinged to said frame and pivotal about a hinge axis toward and away from a closed position above said belt, the improvement which comprises a resilient latch mounted on said frame and pivotal about an axis spaced from and parallel to the axis on which said lid is hinged, said latch having a detent thereon, said lid having a catch movable into and out of engagement with said latch when said lid is pivoted about said hinge axis to pivot said detent and bring said catch into and out of engagement with said detent when said latch is pivoted to said closed position directly above said belt and away from said closed position, respectively, whereby to releasably maintain said lid in said closed position.

37. The invention according to claim 36 wherein said latch is a flat bar of spring material having a lip portion located at at least one end thereof which extends to said lid to provide said detent, means attaching said bar to said frame for pivotal movement about an axis through said bar parallel to said hinge axis, said latch pivotal axis being spaced inwardly from said bar axis toward said frame and away from said hinge axis along said frame, said catch being movable into contact with said lip portion to flex said bar along an epicyclic path while moving into and out of engagement therewith.

38. The invention according to claim 37 wherein said frame is provided by a pair of side plates having opposite insides and outsides with the insides in juxtaposition with each other, said lid being hinged on one of said side plates outwardly an above the outside thereof, said latch bar being in juxtaposition with the outside of said one side plate, said side plate and bar having aligned holes perpendicular to said insides thereof, and fastening means in said holes clamping said bar and side plates together and providing said pivotal mounting for said latch bar.

39. The invention according to claim 38 wherein said side plates have top and bottom surfaces around which said belt travels, said latch detent having a lip extending inwardly toward said side plates over the top surface of at least one of said side plates, said lid having a notch along the rear edge thereof, said catch being provided by a step in the wall of said notch interior of said lid rear edge.

40. The invention according to claim 39 wherein a portion of said lip and said catch have flat surfaces which engage each other when said lid is latched, portions of said lip over the flat surface thereof and portions of said catch above said step which engage each other when said lid is pivoted towards the top surface being complementarily tapered.

41. The invention according to claim 40 wherein said latch bar has detents at the opposite ends thereof each for latching different ones of a pair of lids hinged on said one side plate outwardly of said top and bottom surfaces thereof respectively, said holes being disposed centrally of said latch bar and side plate between said top and bottom surfaces.

* * * * *